(12) United States Patent
Grammer

(10) Patent No.: US 11,555,954 B2
(45) Date of Patent: *Jan. 17, 2023

(54) LED COUPLER FOR LIGHT REFLECTION AND LEAKAGE PREVENTION

(71) Applicant: Valeo North America, Inc., Troy, MI (US)

(72) Inventor: Terry Grammer, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,044

(22) Filed: Jul. 29, 2021

(65) Prior Publication Data

US 2021/0356648 A1 Nov. 18, 2021

Related U.S. Application Data

(63) Continuation of application No. 16/048,648, filed on Jul. 30, 2018, now Pat. No. 11,079,534.

(51) Int. Cl.
| | |
|---|---|
| *F21V 8/00* | (2006.01) |
| *F21V 9/08* | (2018.01) |
| *F21S 43/235* | (2018.01) |
| *F21S 41/39* | (2018.01) |
| *F21S 43/14* | (2018.01) |
| *F21S 41/141* | (2018.01) |

(52) U.S. Cl.
CPC .......... *G02B 6/0061* (2013.01); *F21S 41/141* (2018.01); *F21S 41/39* (2018.01); *F21S 43/14* (2018.01); *F21S 43/235* (2018.01); *F21V 9/08* (2013.01); *G02B 6/0006* (2013.01); *G02B 6/0073* (2013.01)

(58) Field of Classification Search
CPC .. G02B 6/0061; G02B 6/0006; G02B 6/0073; F21S 43/14; F21S 43/141; F21S 43/39; F21V 9/08
See application file for complete search history.

(56) References Cited

U.S. PATENT DOCUMENTS

| | | | |
|---|---|---|---|
| 7,052,168 B2 | 5/2006 | Epstein et al. | |
| 10,393,957 B1 | 8/2019 | Potter | |
| 2003/0016521 A1 | 1/2003 | Wang et al. | |
| 2005/0052871 A1 | 3/2005 | Leu et al. | |
| 2005/0152127 A1 | 7/2005 | Kamiya et al. | |
| 2008/0019659 A1* | 1/2008 | Tao | G02B 6/4298 |
| | | | 385/147 |
| 2008/0025039 A1* | 1/2008 | Guillermo | B60Q 1/323 |
| | | | 362/556 |
| 2014/0126241 A1* | 5/2014 | Hu | G02B 6/0066 |
| | | | 362/610 |

FOREIGN PATENT DOCUMENTS

CN 102402907 A 4/2012

* cited by examiner

*Primary Examiner* — Andrew J Coughlin
*Assistant Examiner* — Jessica M Apenteng
(74) *Attorney, Agent, or Firm* — Valeo North America, Inc.

(57) ABSTRACT

A vehicle lighting device including a light source configured to emit diverging light a fiber bundle including a plurality of optical fibers bundled into a cross sectional shape configured to be optically coupled to the light source; and a coupling device configured to optically couple the light source to the fiber bundle, the coupling device including a reflecting portion configured to reflect the diverging light toward the optical fiber bundle and a blocking portion configured to block light from bleeding from the assembly.

10 Claims, 6 Drawing Sheets

FIG. 5

LED COUPLER FOR LIGHT REFLECTION AND LEAKAGE PREVENTION

CROSS-REFERENCE TO RELATED APPLICATIONS

This application is a continuation of U.S. patent application Ser. No. 16/048,648 filed Jul. 30, 2018 (US 2020/0033529), the disclosure of which is hereby incorporated in its entirety by reference herein.

BACKGROUND

Field of the Disclosure

The present disclosure relates to a device that reflects and redirects diverging light from an LED source into a coupled fiber optic bundle while also blocking undesired light leakage.

Description of the Related Art

Light emitting diodes (LEDs) are becoming more popular as the lighting solution of choice for many consumer and commercial uses. They possess many advantages over traditional light solutions, which include lifespan, energy efficiency, heat output and fire safety, size, color specificity, directionality, instantaneous on/off switching, environmental impact, extreme temperature tolerance, and design flexibility. These traits make LEDs a robust and versatile alternative for applications such as outdoor lighting, industrial/commercial lighting, consumer housing lighting, back-lit consumer devices, medical devices, photography, traffic signals, and automotive lighting.

In the field of automotive lighting, LEDs of varying color and power are used as headlights, daytime running lights, turn indicators, and passenger cabin or display lighting. Optical fibers, also known as fiber optics, are clear strands of plastic, glass, or silica consisting of a central core surrounded by a cladding and a protective coating can be coupled to an LED such that light is injected into the core of the fiber, which remains trapped until emerging from the opposite end of the fiber. The cladding can also be removed such that the length of the fiber is visible and illuminated, creating a light fiber/pipe effect. Using this method, point-to-point light transmission, including around angled obstacles, is possible with little loss. However, poor coupling of a fiber optic or fiber optic bundle to said LED can lead to inefficiencies in the lighting system. A device is needed to maximize the transmission of emitted light from the LED to the fiber bundle while also allowing facile adjustment of the distance between the bundle interface and the focal point of the LED.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The One object of the present disclosure is to address the above-noted problems with prior art vehicle lighting devices. This and other objects are met by the following aspects of the invention:

(1) A vehicle lighting device including a light source configured to emit diverging light a fiber bundle including a plurality of optical fibers bundled into a cross sectional shape configured to be optically coupled to the light source; and a coupling device configured to optically couple the light source to the fiber bundle, the coupling device including a reflecting portion configured to reflect the diverging light toward the optical fiber bundle and a blocking portion configured to block light from bleeding from the assembly.

(2) The vehicle lighting device of claim 1, further including an optical fiber panel including a portion of each of the plurality of optical fibers arranged in a predetermined form to provide a light emitting surface.

(3) The vehicle lighting device of claim 1, wherein the light source includes a solid state light emitting device.

(4) The vehicle lighting device of Aspect 3, wherein the light source includes an LED.

(5) The vehicle lighting device of Aspect 1, wherein the coupling device is made of metallic material, the reflecting portion being a polished surface and the blocking portion being a non-polished surface.

(6) The vehicle lighting device of Aspect 1, wherein the coupling device is made of an opaque plastic material, the reflecting portion having a reflective coating thereon.

(7) A light emitting diode (LED) coupling device for an automotive vehicle, including a first cavity configured to receive a base of an LED; a second cavity configured to receive at least a portion of the LED through the first cavity and including variably sloped sidewalls configured to reflect divergent light emitted from the LED towards an input face of a fiber optic bundle, wherein the second cavity is joined to the first cavity and a first opening at the interface between the first cavity and the second cavity is narrower than a width of the first cavity; and a third cavity joined to the second cavity and including a stopping lip, wherein the third cavity is configured to receive the fiber optic bundle and the stopping lip is configured to prevent translation of the fiber optic bundle beyond a predetermined distance, wherein a second opening at the interface between the second cavity and the third cavity is wider than the first opening at the interface between the first cavity and the second cavity.

(8) The coupling device according to aspect 1, wherein the shape of the variably sloped sidewalls of the second cavity is parabolic and the parabolic shape opens towards the input face of the fiber optic bundle.

(9) The coupling device according to aspect 1, wherein a material of the coupling device includes at least one of acetal, polyethylene, polycarbonate, polyamide, polystyrene, polypropylene, aluminum, heat-treated aluminum (hokotol), tungsten, copper, brass, bronze, silver, gold, chromium, platinum, polytetrafluoroethylene (PTFE), and a fluoropolymer known as Spectralon by Labsphere.

(10) The coupling device according to aspect 3, wherein the coupling device is configured to absorb heat generated by the LED.

(11) The coupling device according to aspect 1, wherein the first cavity is configured to block light bleed emitted by the LED through the interface between the first cavity and the second cavity.

(12) A light emitting diode (LED) coupling system for an automotive vehicle, including a light emitting diode (LED) including a base and a light emitting portion; an LED coupler, including: a first cavity configured to receive a base of an LED; a second cavity configured to receive a light emitting portion of the LED through the first cavity and including variably sloped sidewalls configured to reflect divergent light emitted from the LED towards an input face of a fiber optic bundle, wherein the second cavity is joined to the first cavity and a first opening at the interface between the first cavity and the second cavity is narrower than a width of the first cavity; and a third cavity joined to the second cavity and including a stopping lip, wherein the third cavity is configured to receive the fiber optic bundle and the stopping lip is configured to prevent translation of the fiber optic bundle beyond a predetermined distance, wherein a second opening at the interface between the second cavity and the third cavity is wider than the first opening at the interface between the first cavity and the second cavity.

(13) The LED coupling system according to aspect 6, wherein the fiber optic bundle is inserted into the third cavity at a predetermined distance and including at least one optical fiber configured to transmit light from an input face to an output face.

(14) The LED coupling system according to aspect 7, wherein the shape of the variably sloped sidewalls of the second cavity is parabolic and the parabolic shape opens towards the input face of the fiber optic bundle.

(15) The LED coupling system according to aspect 7, wherein a material of the LED coupler includes at least one of acetal, polyethylene, polycarbonate, polyamide, polystyrene, polypropylene, aluminum, heat-treated aluminum (hokotol), tungsten, copper, brass, bronze, silver, gold, chromium, platinum, polytetrafluoroethylene (PTFE), and a fluoropolymer known as Spectralon by Labsphere.

(16) The LED coupling system according to aspect 7, wherein a material of the LED coupler is configured to absorb heat generated by the LED.

(17) The LED coupling system according to aspect 7, wherein the first cavity is configured to block light bleed emitted by the LED through the interface between the first cavity and the second cavity.

(18) The LED coupling system according to aspect 7, wherein the beam angle of the LED is 120 degrees and the focal length of the emitted light of the inserted LED in the LED coupler is 0.3 mm.

(19) The LED coupling system according to aspect 7, wherein the beam angle of the LED is less than 120 degrees and the fiber optic bundle is configured to be partially inserted into the third cavity.

(20) A method of installing an LED coupling system, including: mounting a light emitting diode (LED) coupler onto an LED including a base and a light emitting portion, the LED coupler including: a first cavity configured to receive the base of the LED; a second cavity configured to receive a light emitting portion of the LED through the first cavity and including variably sloped sidewalls configured to reflect divergent light emitted from the LED towards an input face of a fiber optic bundle, wherein the second cavity is joined to the first cavity and a first opening at the interface between the first cavity and the second cavity is narrower than a width of the first cavity; and a third cavity joined to the second cavity and including a stopping lip, wherein the third cavity is configured to receive the fiber optic bundle and the stopping lip is configured to prevent translation of the fiber optic bundle beyond a predetermined distance, wherein a second opening at the interface between the second cavity and the third cavity is wider than the first opening at the interface between the first cavity and the second cavity; determining, via processing circuitry, a focal length of the emitted light of the inserted LED in the LED coupler, wherein the focal length is based on an angle of the variably sloped sidewalls of the LED coupler and the beam angle of the LED; and inserting the fiber optic bundle into the third cavity a predetermined distance, wherein the predetermined distance is equal to the focal point of the installed LED and LED coupler.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper,"

"lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Figures 6A, 6B:
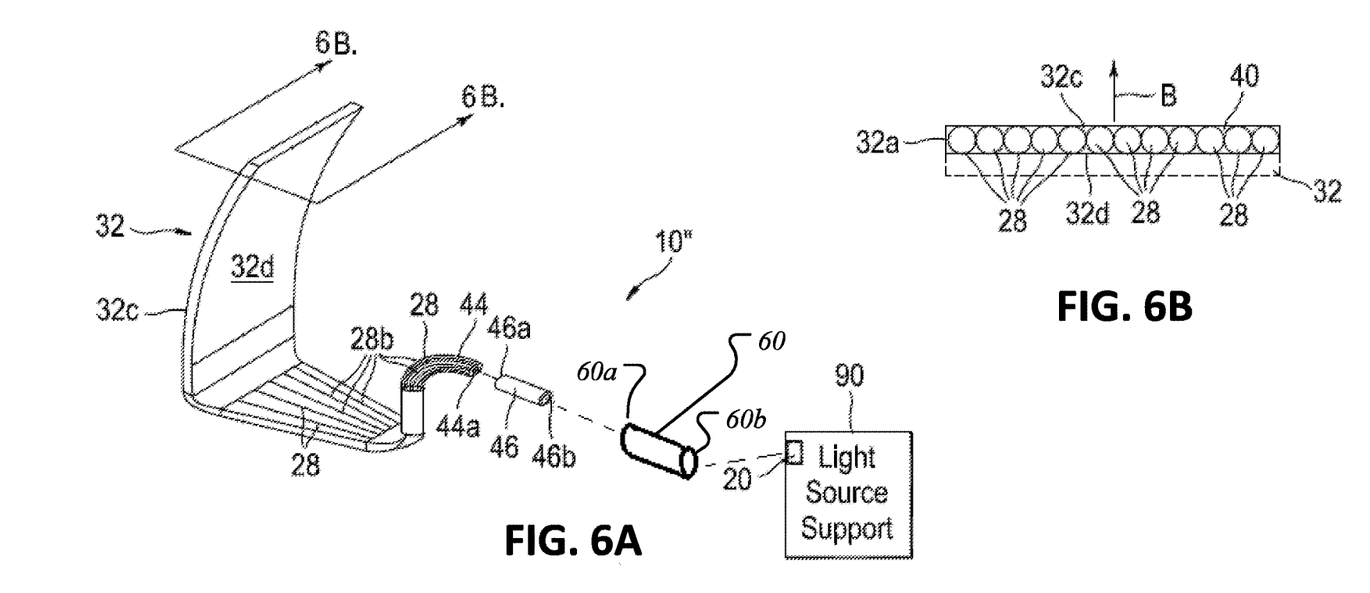
FIG. 6A is an exploded view showing arrangement of the components of a vehicle lighting device in accordance with an embodiment of the invention.
FIG. 6B is a sectional view of the panel of FIG. 6A.
Figure 6C:
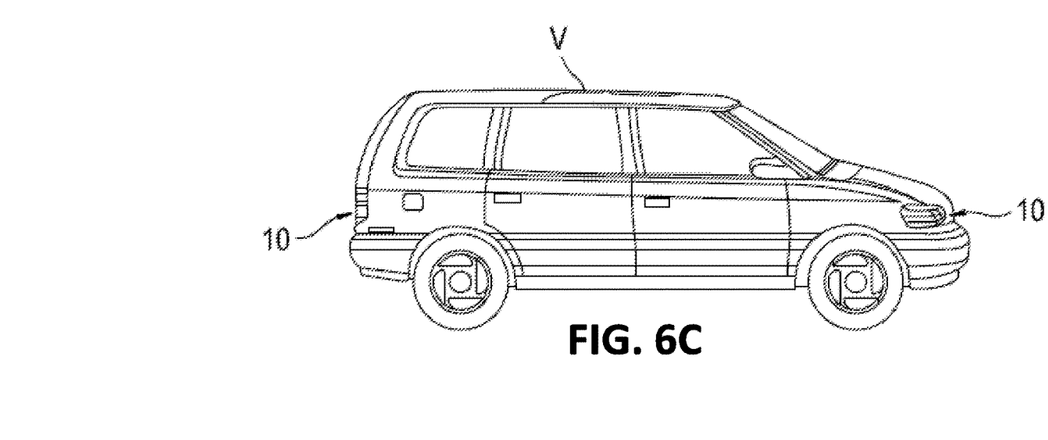
FIG. 6C is an example Vehicle in which embodiments of the invention may be implemented.

FIG. 6A is an exploded view showing arrangement of the components of a vehicle lighting device in accordance with an embodiment of the invention. For example, the device 10' may be included in the headlight or taillight of a vehicle V as shown in FIG. 6C. As seen in FIG. 6A, the system 10' includes a panel 32 having a first side 32c through which light from the plurality of optical fibers 28 is emitted. The light may also be emitted on a second side 32d this second side may be partially or fully coated with a reflective material 32m (shown in phantom) in FIG. 6B in order to reflect light through the first side 32c.

FIG. 6B is a sectional view of the panel of FIG. 6A. As seen, fibers 28 are embedded arranged in a fiber array and embedded in a substrate 40, which could be a polymer, resin or other conventional substrate. Portions 28b of the plurality of optical fibers 28 extend out of the substrate 40 and panel 32 and are gathered and combined in a fiber bundle 44 to define a light-receiving end or input end 44a. In the embodiment of FIG. 6A, the input end 44a becomes operatively positioned in a first end 46a of a cap 46, as well as opposing end 46b. The cap 46 may be a ferrule and include a wrap, sleeve, adhesive, tape, resin or the like to facilitate holding the fibers 28 in the bundled position.

Coupling device 60 has a first and second ends 60a and 60b. The first end 60a receives the second end 46b of cap 46, and the second end 60b is coupled to the light source support of a vehicle light housing to provide optical coupling with the light source 20.

It should be understood that the illustrations being described show a single light source 20 associated with a single panel 32, but a single light source 20 may be used for multiple panels 32. For example, ends of the optic fibers 28 of different panels 32 may be bundled and coupled to a single cap 46 associated with the single light source 20. In such configuration, the light source 20 is optically coupled to the optical fibers 28 from multiple panels 32, and a single light source 20 can be used with multiple panels 32. In such a case, it may be necessary to provide a cap (not shown) that is adapted to receive the multiple bundles of fibers 28.

Advantageously the embodiments described herein are particularly suited for exterior lighting and in environments where it is necessary that the lighting match or conform to the contour or styling of the vehicle V.

Light emitting diodes (LEDs) can be used in vehicles for functional and decorative purposes. These include exterior and interior applications. Commonly, LEDs coupled to a fiber optic and fiber optic bundles can be used to route light from a light source to different parts of the passenger cabin space for aesthetic lighting. The efficiency of the lighting is dependent on the LED properties as well as the coupling of the LEDs to the fiber optic bundle. Ideally, all divergent light emitted from the LED will be reflected back towards the fiber optic bundle and not absorbed by coupling material. Described herein is a design for a device with features that reflect and redirect light emitted from an LED light source towards a coupled fiber optic bundle while also preventing light leakage. The device can also account for multiple types of LED light sources with varying beam angles.

Figure 1:
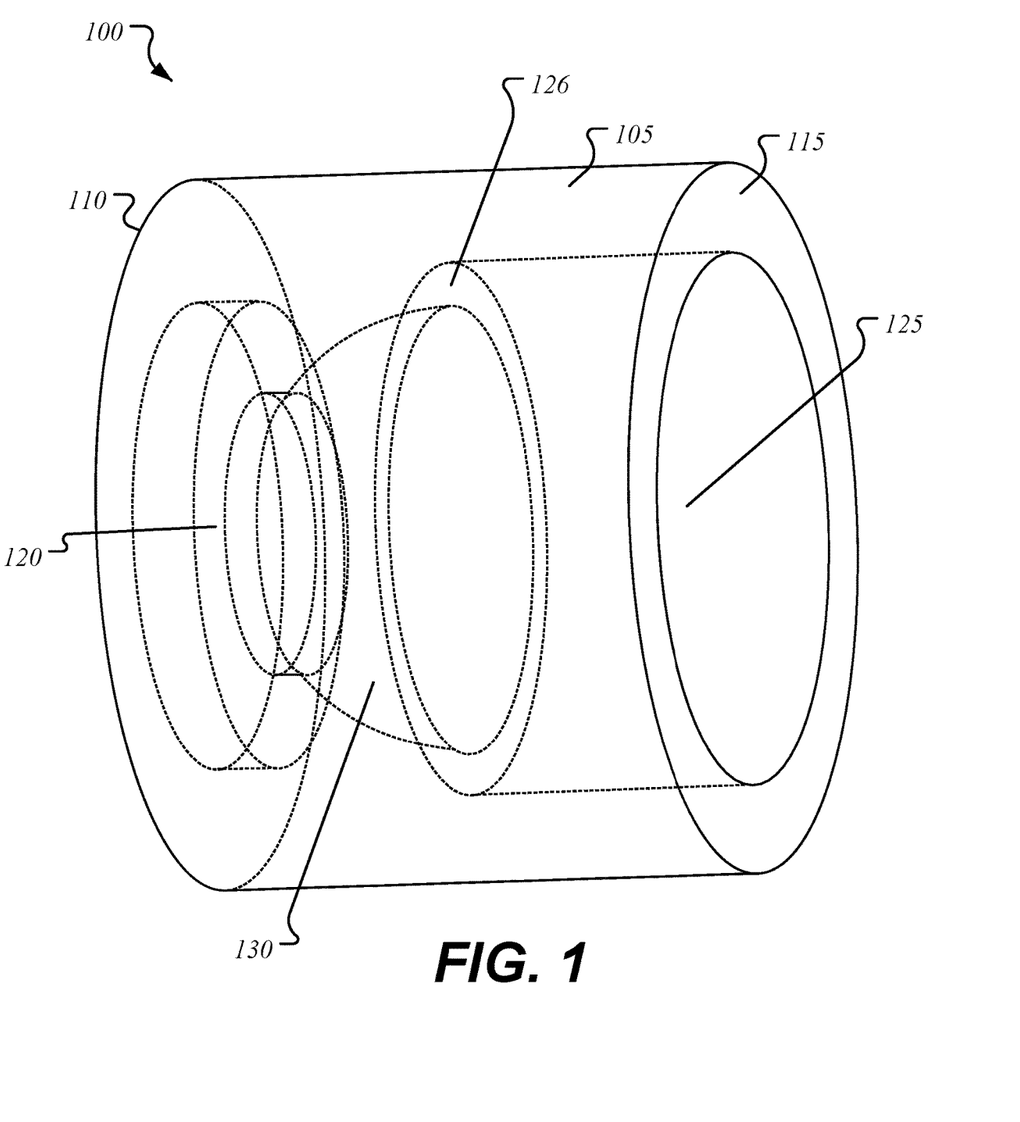
FIG. 1 is a perspective view schematic of an LED coupler, according to an exemplary embodiment of the present disclosure.
Figure 2:
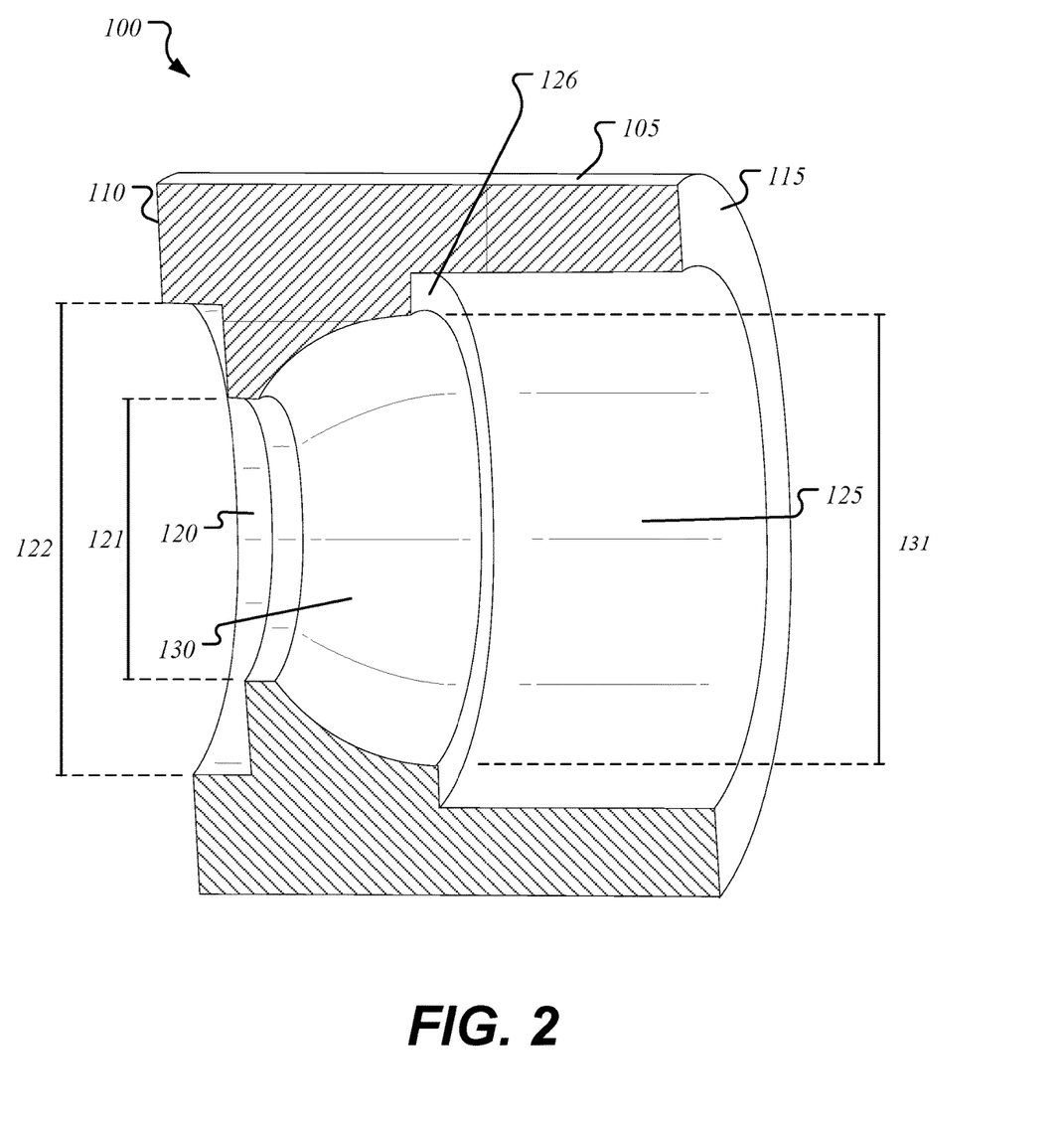
FIG. 2 is a cross-sectional view of an LED coupler, according to an exemplary embodiment of the present disclosure.

As illustrated in FIGS. 1-2 according to one or more aspects of the disclosed subject matter, an LED coupler 100 includes an outer surface 105, a proximal end 110 relative to an LED 205, a distal end 115 relative to the LED 205, an LED cavity 120, a fiber optic cavity 125, and a reflector cavity 130. FIG. 1 illustrates a perspective view of the LED coupler 100 while FIG. 2 illustrates a cross-sectional view of the LED coupler 100. In one embodiment, the LED coupler 100 adopts a substantially cylindrical shape (as shown) and the outer surface 105 encompasses one continuous surface along the shaft of the cylinder shape. In an alternative embodiment, the cross sectional shape of the LED coupler 100 can be, for example, square, pentagonal, hexagonal, octagonal, or any shape deemed optimal for the implementation of the LED coupler 100.

Figure 3:
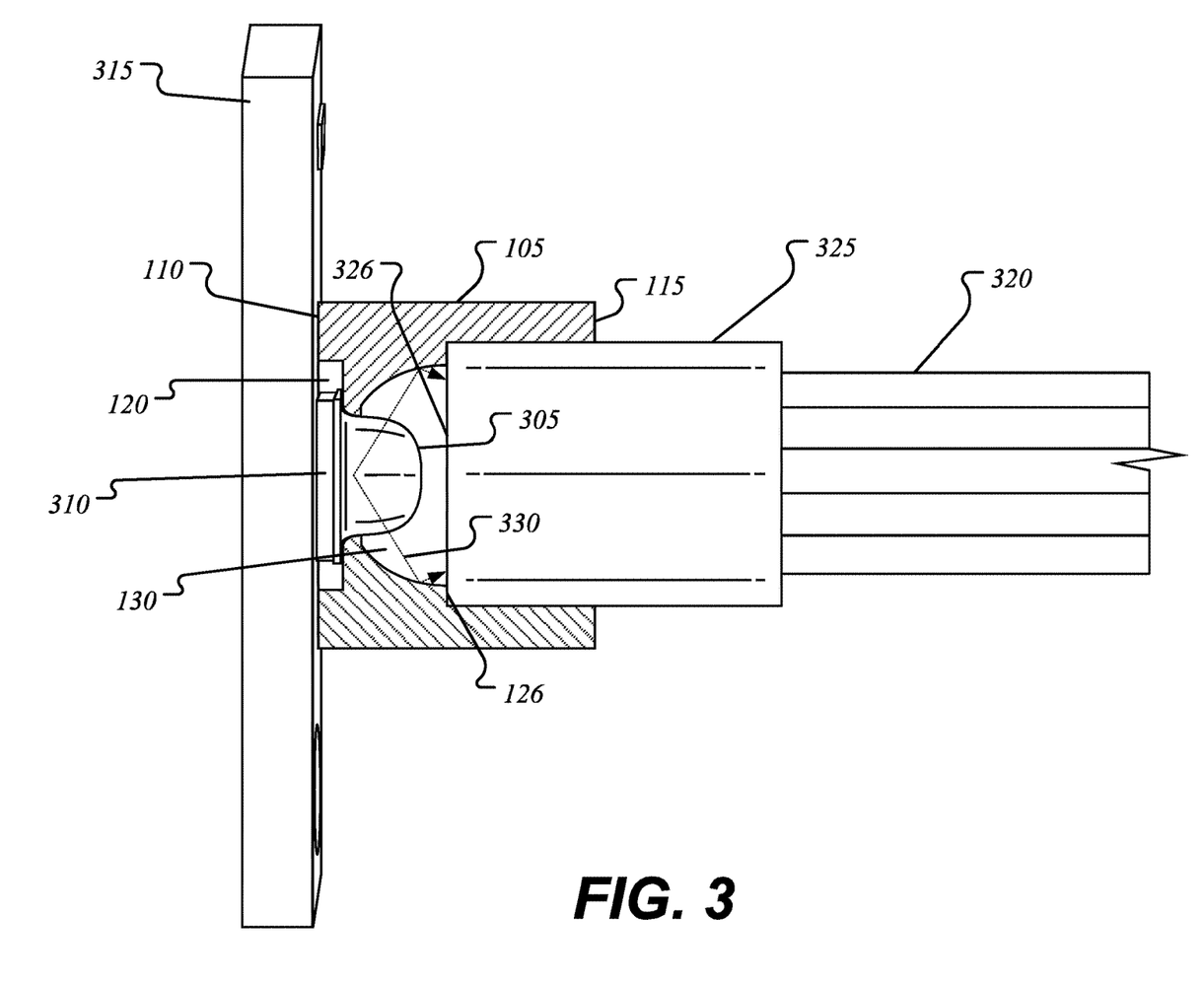
FIG. 3 is a cross-sectional view of an LED coupler with a fiber optic bundle fully inserted, according to an exemplary embodiment of the present disclosure.

Returning to the first embodiment, as illustrated in FIG. 3 according to one or more aspects of the disclosed subject matter, the LED coupler 100 is configured to be placed over the LED 305 and an attached LED base 310 such that the LED 305 is inserted into the reflector cavity 130 and the LED base 310 is inserted into the LED cavity 120. The proximal end 110 of the LED coupler 100 is disposed proximal to the LED 305 and LED base 310 when mounted on the LED 305. The LED cavity 120 is disposed towards the proximal end 110, wherein the LED cavity 120 is a volume of space configured to accommodate the LED base 310. The LED 305 and LED base 310 can be attached to a circuit board 315. The circuit board 315 can include a power source and circuitry configured to illuminate the LED 305, and a heat sink thermally coupled to the LED 305 and LED base 310 configured to dispel heat generated by the LED 305.

The LED 305 can be configured to emit a predetermined spectrum of light from a wide range of wavelengths and varying power. For example, the LED 305 can emit light from less than 400 nm (UV) to greater than 750 nm (infrared) at a power of less than 1 mA to greater than 1 A. The LED 305 can also emit light with a predetermined beam angle, wherein the beam angle is the angle at which the emitted light is distributed. For example, the beam angle range can be less than 10 degrees to greater than 120 degrees. For example, the LED 305 emits red light from 625 to 630 nm at 1.8 A with a beam angle of 60 degrees. Various combinations of wavelength spectra, power output, and beam angle can be combined to suit a particular application, including interior lighting, traffic signals, photography, backlit consumer devices, medical devices, and automotive lighting.

The LED cavity 120 can be designed to accommodate the LED base 310, wherein the volume of the cavity is larger than the volume of the LED base 310. The cross-sectional shape of the LED base 310 can be, for example, square (as shown), and the cross-sectional shape of the LED cavity 120 can be, for example, circular (as shown), wherein the radius of the circle is at least as large as the longest diagonal of the square. Other cross-sectional shapes for the LED base 310 and LED cavity 120, or shapes for the volume of the LED base 310 and LED cavity 120, can be contemplated such that the LED cavity 120 can accommodate a volume of the LED base 310. Notably, the LED cavity 120 can block any divergent light emitted from the LED 305 that is not reflected in a direction away from the LED base 310. Without the LED cavity 120, an air gap may be present between the reflector cavity 130 and the LED base 310, wherein divergent light could bleed through the gap and cause unwanted illumination. Thus, the addition of the LED cavity 120 serves to prevent this light bleed.

The fiber optic cavity 125 can be a volume of material removed to accommodate a fiber optic bundle 320 and a fiber optic bundle cap 325. The fiber optic cavity 125 shape can be a predetermined shape that matches the shape of the fiber optic bundle cap 325 when inserted into the fiber optic cavity 125. For example, the fiber optic cavity 125 can be substantially cylindrical and the fiber optic bundle cap 325 can also be substantially cylindrical with the fiber optic cavity 125 having a radius marginally larger than the fiber optic bundle cap 325. In this manner, the fiber optic bundle cap 325 can be inserted into the fiber optic cavity 125 without leaving a substantial gap between the two features. In other words, the exterior surface of the fiber optic bundle cap 325 is substantially flush with the sidewalls of the fiber optic cavity 125 when inserted. The fiber optic bundle 320 and fiber optic bundle cap 325 can be inserted fully or partially into the fiber optic cavity 125. For example, the fiber optic bundle 320 and fiber optic bundle cap 325 can be inserted until meeting a stopping lip 126. The stopping lip 126 can be a feature designed to prevent movement of the fiber optic bundle 320 and fiber optic bundle cap 325 beyond a predetermined point along the length of the LED coupler 100, for example a predetermined distance away from the distal end 115, the proximal end 110, the LED 305, the LED base 310, or any other feature as a point of reference depending on the application.

The fiber optic bundle 320 can include at least one elongated light-transmitting optical fiber, for example an optical fiber with a silica (glass) core and a silica cladding, wherein each optical fiber is configured to transmit light between the two ends of the fiber. This occurs when the angle of incidence of the light at an input face 326 of the fiber optic bundle 320 is below a pre-determined threshold value based on the optical fiber material. The light will enter the optical fiber and total internal reflection of the light will result in the light exiting the optical fiber at an opposite end (not shown). Each optical fiber can further include a protective coating, and a jacket can surround the fiber optic bundle 320, which can result in the optical fibers only appearing to emit light at the end of the optical fiber. The protective coating and jacket can be excluded to allow for the appearance of illumination along the entirety of the optical fiber. The fiber optic bundle cap 325 can be attached to the fiber optic bundle 320 to provide additional strength to the end of the fiber optic bundle 320 and serve as a referencing means to mate with the LED coupler 100.

The reflector cavity 130 can be a volume of material removed to accommodate the LED 305. The reflector cavity 130 can include variably sloped sidewalls that open towards the distal end 115 and the fiber optic cavity 125. For example, the slope of the sidewalls can be linear. For example, the slope of the sidewalls can be parabolic. The shape of the reflector cavity 130 can be conical with a substantially circular cross-section (as shown). The slope of the sidewalls can be designed to reflect divergent light rays emitted from the LED 305 such that they are redirected into the input face 326 of the fiber optic bundle 320 and the fiber optic bundle cap 325. To achieve reflectivity along the sidewalls, the reflector cavity 130 can be coated with a reflective material. The reflective sidewalls can reflect a range of wavelengths ranging from ultraviolet, visible light, and infrared radiation. For example, the reflector cavity 130 can have a reflectance of 50% or more as compared to a National Institute of Standards and Technology (NIST) spectral reflectance standard, for example NIST 38060S, for wavelengths from 250-2500 nm, or for visible light wavelengths from 350-900 nm. The reflector cavity 230 can have a reflectance of 80% or more, preferably 90% or more, 95% or more or 98% or more as compared to NIST 38060S for a mirror-like reflectance for wavelengths from 250-2500 nm, or for visible light wavelengths from 350-900 nm. Non-limiting examples of reflective coating materials include at least one of evaporated silver, gold, aluminum, chrome, nickel, titanium nitride, and copper, reflective paint, such as those impregnated with barium sulfate, glass beads, or silver beads, or any combinations thereof. Non-limiting examples of LED coupler 100 materials include at least one of acetal, polyethylene, polycarbonate, polyamide, polystyrene, polypropylene, or any combinations thereof.

In an alternative embodiment, the LED coupler 100 is fabricated from a reflective material. Non-limiting examples of reflective materials for the LED coupler 100 include at least one of aluminum, hokotol, tungsten, copper, brass, bronze, silver, gold, chromium, platinum, polytetrafluoroethylene (PTFE), a fluoropolymer known as Spectralon by Labsphere, or any combinations thereof. Advantageously, the use of a metal or metal alloy for the LED coupler 100 can aid in the dissipation of heat generated by the LED 305 since the LED coupler 100 is in contact with the LED 305 and LED base 310.

Depending on the material selection, the LED coupler 100 can be fabricated by myriad methods including at least one of, but not limited to, CNC machining, 3D printing, injection molding, transfer molding, and stamping.

In another embodiment, the shape of the cross-section of the reflector cavity 130 can be square, rectangular, pentagonal, hexagonal, octagonal, or any other shape designed to redirect the divergent light emitted from the LED 305 into the fiber optic bundle 320. Similarly, the cross-sectional shape of the fiber optic cavity 125 and fiber optic bundle cap 325 can be designed to match the shape of the reflector cavity 130. For example, the reflector cavity 130 can have a square cross-sectional shape, the fiber optic cavity 125 can have a square cross-sectional shape, and the fiber optic bundle cap 325 can have a square cross-sectional shape. Notably, in this example the cross-sectional shape of the fiber optic bundle 320 can be square and match the fiber optic bundle cap 325, or it can be a different cross-sectional shape, such as circular.

As illustrated in FIG. 2, the reflector cavity 130 is joined to the LED cavity 120 and a first opening 121 at the interface between the LED cavity 120 and the reflector cavity 130 is narrower than a width 122 of the LED cavity 120. The fiber optic cavity 125 is joined to the reflector cavity 130 wherein a second opening 131 at the interface between the reflector cavity 130 and the fiber optic cavity 125 is wider than the first opening 121 at the interface between the LED cavity 120 and the reflector cavity 130.

Figure 4:
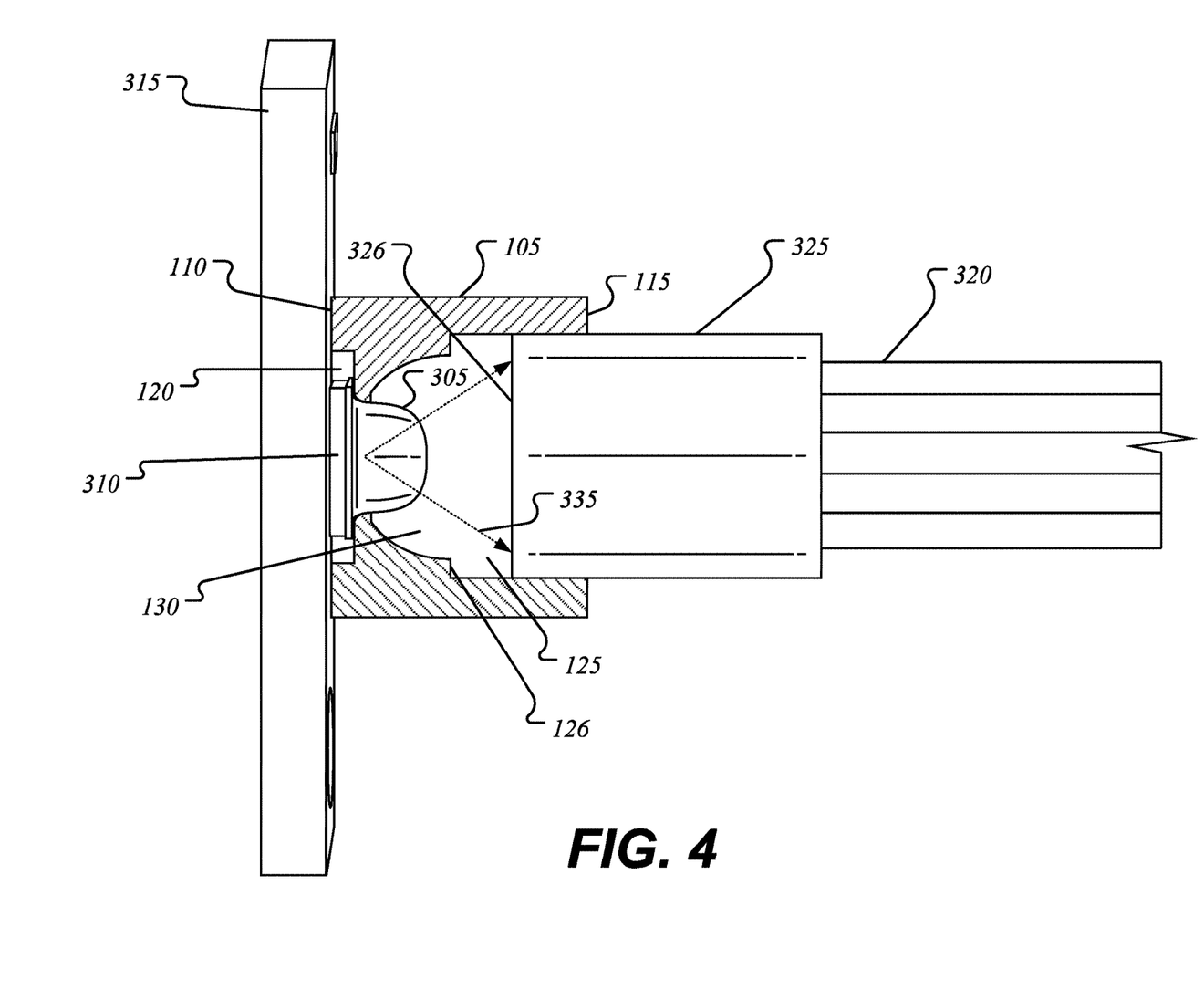
FIG. 4 is a cross-sectional view of an LED coupler with a fiber optic bundle partially inserted, according to an exemplary embodiment of the present disclosure.

The LED coupler 100 can be used with myriad LEDs 305 that can have varying beam angles and allow for adjustment of the inserted fiber optic bundle 320 based on the beam angle. For example, the LED 305 in FIG. 3 can have a wide beam angle of 120 degrees and the curvature of the sidewalls of the reflector cavity 130 can be configured to reflect a plurality of wide beam angle LED rays 330 into the fiber optic bundle 320 at a distance equal to the focal point of the LED 305 and reflected light, for example 0.3 mm. As illustrated in FIG. 4 according to one or more aspects of the disclosed subject matter, the LED 305 can have a narrower beam angle of 60 degrees and emit a plurality of narrow beam angle LED rays 335. The narrow beam angle LED rays 335 do not reflect off the sidewalls of the reflector cavity 130 and instead shine directly on the input face 326 of the fiber optic bundle 320. Notably, in this case and for other instances where divergent light from the LED 305 does not reflect off the curved sidewalls, the LED coupler 100 can act as a jig and enables adjustment of the fiber optic bundle 320 further away from the LED 305 to receive more of the narrow beam angle LED rays 335 at each optical fiber in the fiber optic bundle 320 without the need for a different LED coupler 100 per LED 305.

As mentioned previously, the reflective sidewalls of the reflector cavity 130 can have a predetermined curvature and height. The predetermined curvature and height can be determined based on the beam angle of the LED 305 and width of the fiber optic bundle 320 mated to the LED coupler 100. The curvature and height can be calculated via computer simulations to reflect a predetermined amount of divergent light from the LED 305 back towards the input face 326 of the fiber optic bundle 320 such that the divergent light will enter and result in total internal reflection.

In one embodiment, the LED coupler 100 can be mounted on the LED 305 and LED base 310 and not be chemically or mechanically attached to the circuit board 315. In this manner, at least one feature of the LED coupler 100 is slightly physically deformed upon mounting on the LED 305 such that friction forces keep the LED coupler 100 attached. For example, the LED cavity 120 can have a shape and volume similar to that of the LED base 310, wherein the insertion of the LED base 310 into the LED cavity 120 causes the LED cavity 120 to slightly deform and enlarge. When the LED base 310 is fully disposed inside the LED cavity 120, the sliding friction forces between the sidewalls of both features can require substantial energy to overcome in order to remove the LED coupler 100.

In another embodiment, the LED coupler 100 is mechanically attached to the circuit board 315. The LED coupler 100 can be bolted to the circuit board 315. The material used to bolt the LED coupler 100 to the circuit board 315 can advantageously serve as an addition means of transferring heat generated by the LED 305 to the LED coupler 100 to the heat sink on the circuit board 315. Other non-limiting examples of securing the LED coupler 100 to the circuit board 315 include at least one of chemical glue, soldering, welding, and clamping.

The fiber optic bundle 320 and fiber optic bundle cap 325 can be inserted into the fiber optic cavity 125 manually by a human operator or by an automated machine, such as a robot arm, as instructed by a computer 2400. The computer 2400 can determine the insertion distance based on the beam angle of the LED 305 and calculate the focal point of the LED 305 and reflected light. The computer 2400 can instruct the robot arm to insert the fiber optic bundle 320 and fiber optic bundle cap 325 into the fiber optic cavity 125 the calculated distance.

Figure 5:
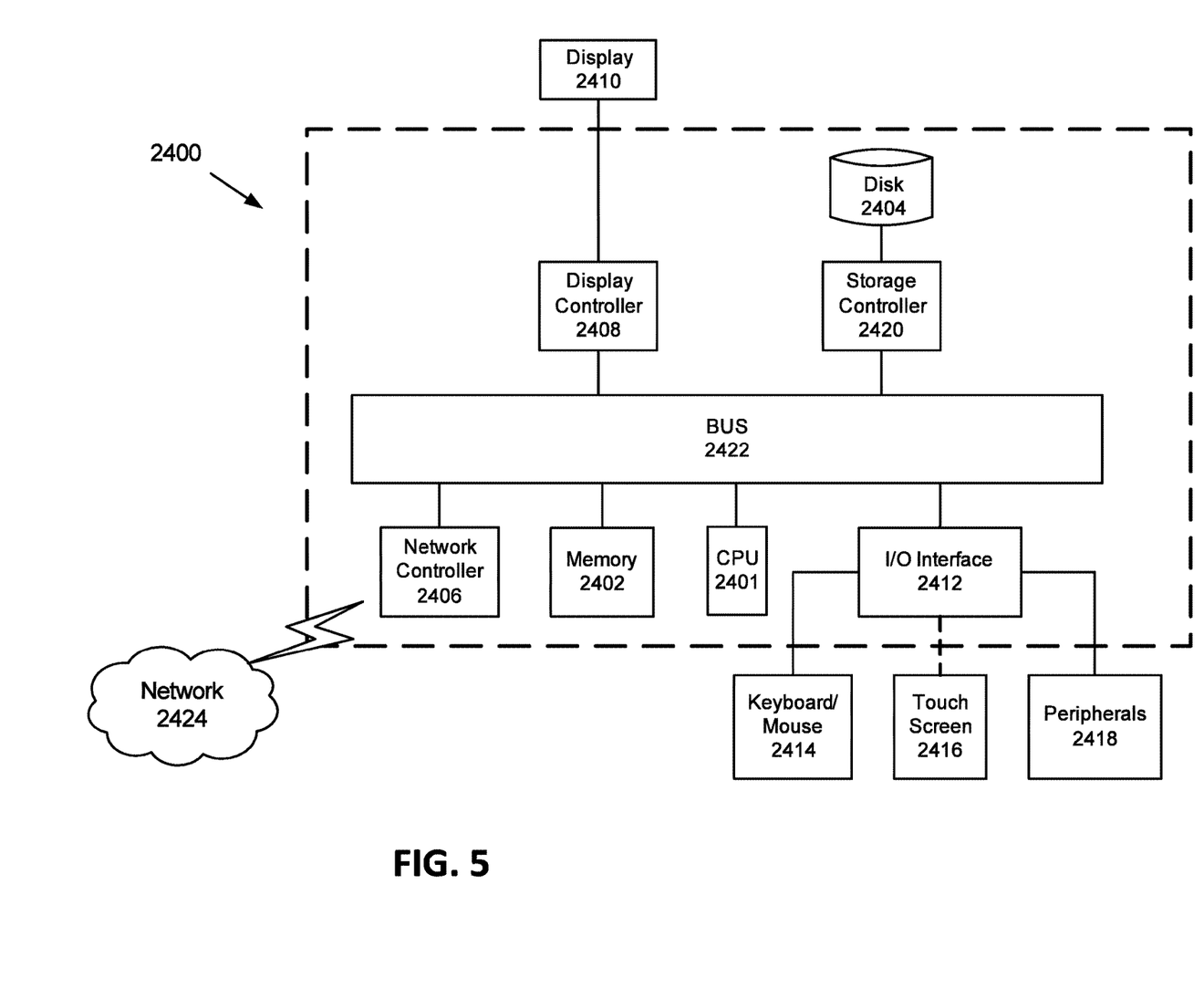
FIG. 5 is a block diagram of a hardware description of a computer, according to an exemplary embodiment of the present disclosure.

FIG. 5 is a block diagram of a hardware description of a computer 2400 used in exemplary embodiments. In the embodiments, computer 2400 can be a desk top, laptop, or server. Computer 2400 could be used as the server 130 or one or more of the client devices 140 illustrated in FIG. 1B.

In FIG. 5, the computer 2400 includes a CPU 2401 which performs the processes described herein. The process data and instructions may be stored in memory 2402. These processes and instructions may also be stored on a storage medium disk 2404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 2400 communicates, such as a server or computer.

Further, the claimed advancements may be provided as a utility application, background daemon, or component of an operating system, or combination thereof, executing in conjunction with CPU 2401 and an operating system such as Microsoft® Windows®, UNIX®, Oracle® Solaris, LINUX®, Apple macOS® and other systems known to those skilled in the art.

In order to achieve the computer 2400, the hardware elements may be realized by various circuitry elements, known to those skilled in the art. For example, CPU 2401 may be a Xenon® or Core® processor from Intel Corporation of America or an Opteron® processor from AMD of America, or may be other processor types that would be recognized by one of ordinary skill in the art. Alternatively, the CPU 2401 may be implemented on an FPGA, ASIC, PLD or using discrete logic circuits, as one of ordinary skill in the art would recognize. Further, CPU 2401 may be implemented as multiple processors cooperatively working in parallel to perform the instructions of the inventive processes described above.

The computer 2400 in FIG. 5 also includes a network controller 2406, such as an Intel Ethernet PRO network interface card from Intel Corporation of America, for interfacing with network 2424. As can be appreciated, the network 2424 can be a public network, such as the Internet, or a private network such as LAN or WAN network, or any combination thereof and can also include PSTN or ISDN sub-networks. The network 2424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 2400 further includes a display controller 2408, such as a NVIDIA® GeForce® GTX or Quadro® graphics adaptor from NVIDIA Corporation of America for interfacing with display 2410, such as a Hewlett Packard® HPL2445w LCD monitor. A general purpose I/O interface 2412 interfaces with a keyboard and/or mouse 2414 as well as an optional touch screen panel 2416 on or separate from display 2410. General purpose I/O interface 2412 also connects to a variety of peripherals 2418 including printers and scanners, such as an OfficeJet® or DeskJet® from Hewlett Packard.

The general purpose storage controller 2420 connects the storage medium disk 2404 with communication bus 2422, which may be an ISA, EISA, VESA, PCI, or similar, for interconnecting all of the components of the computer 2400. A description of the general features and functionality of the display 2410, keyboard and/or mouse 2414, as well as the display controller 2408, storage controller 2420, network controller 2406, and general purpose I/O interface 2412 is omitted herein for brevity as these features are known.

The advantages of the disclosed LED coupler 100 are summarized again as follows: any light bleed between the reflector cavity 130 and the LED 305 is blocked by the LED cavity 120; divergent light rays emitted from the LED 305 are reflected back towards the fiber optic bundle 320, which leads to reduced absorption of the divergent light rays and reduced generated heat from the absorption; the LED coupler 100 can be made of a material that reflects the divergent light rays while also acting as an additional heat sink that helps transfer heat from the LED 305 and LED base 310 to the heat sink on the circuit board 315; and the LED coupler 100 can serve as a jig wherein the fiber optic bundle 320 can be inserted fully or partially depending on the beam angle of the LED 305 used. The reflected light results in more usable light, which means a lower output LED 305 can be used and thusly the lower output LED 305 generates even less heat.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

What is claimed is:

1. A coupling device of a vehicle lighting device in an assembly comprising:
    a first cavity configured to receive a base of a number of light sources;
    a receiving cavity configured to receive a light emitting portion of said light sources through the first cavity that includes a number of variably sloped sidewalls;
    said light sources configured to emit light through a number of fiber bundles that include a number of optical fibers, said optical fibers configured to optically couple to said light sources;
    the coupling device including
        a reflective portion that reflects a number of divergent light rays towards said fiber bundles; and
        a blocking portion that prevents light from bleeding from the assembly.

2. An automotive vehicle that applies the coupling device of claim 1.

3. The coupling device of claim 1, where a material of the coupling device includes at least one of acetal, polyethylene, polycarbonate, polyamide, polystyrene, polypropylene, aluminum, heat-treated aluminum (hokotol), tungsten, copper, brass, bronze, silver, gold, chromium, platinum, polytetrafluoroethylene (PTFE), and a fluoropolymer known as SPECTRALON.

4. A coupling device of a vehicle used in a lighting assembly comprising:
    a number of light sources configured to emit light;
    a first cavity configured to receive said light sources;
    a receiving cavity configured to receive a light emitting portion of said light sources through the first cavity that includes a number of variably sloped sidewalls;
    a fiber bundle including a number of optical fibers bundled in a cross-sectional shape arrangement that is configured to be optically coupled to said light sources; and
    the coupling device configured to optically couple said light sources to the fiber bundle, the coupling device including a reflecting portion that reflects light toward the optical fiber bundle and a blocking portion that blocks light from bleeding from said assembly.

5. The coupling device of claim 4, further comprising an optical fiber panel including a portion of each number of optical fibers arranged in a predetermined form configured to provide a number of light emitting surfaces.

6. The coupling device of claim 4, where said light sources include at least a solid state light emitting device.

7. The coupling device of claim 6, where said light sources comprise a light emitting diode (LED).

8. The coupling device of claim 4, where the coupling device is made of metallic material, the reflecting portion being a polished surface and the blocking portion being a non-polished surface.

9. The coupling device of claim 4, wherein the coupling device is made of an opaque plastic material, the reflecting portion having a reflective coating thereon.

10. A coupling system for a lighting assembly of an automotive vehicle comprising:
    a light emitting diode (LED) that includes a base;
    an LED coupler that includes
        a first cavity configured to receive the base of the LED,
        a second cavity configured to receive a light emitting portion of the LED through the first cavity that includes a number of variably sloped sidewalls configured to reflect a number of divergent light rays emitted from the LED towards an input face of a fiber optic bundle, wherein the second cavity is joined to the first cavity and a first opening at an interface between the first cavity and the second cavity is narrower than a width of the first cavity; and
        a third cavity joined to the second cavity includes a stopping lip,
wherein the third cavity is configured to receive the fiber optic bundle,
wherein the stopping lip is configured to prevent translation of the fiber optic bundle beyond a predetermined distance,
wherein a second opening at the interface between the second cavity and the third cavity is wider than the first opening at an interface between the first cavity and the second cavity.

* * * * *